Figure 1:
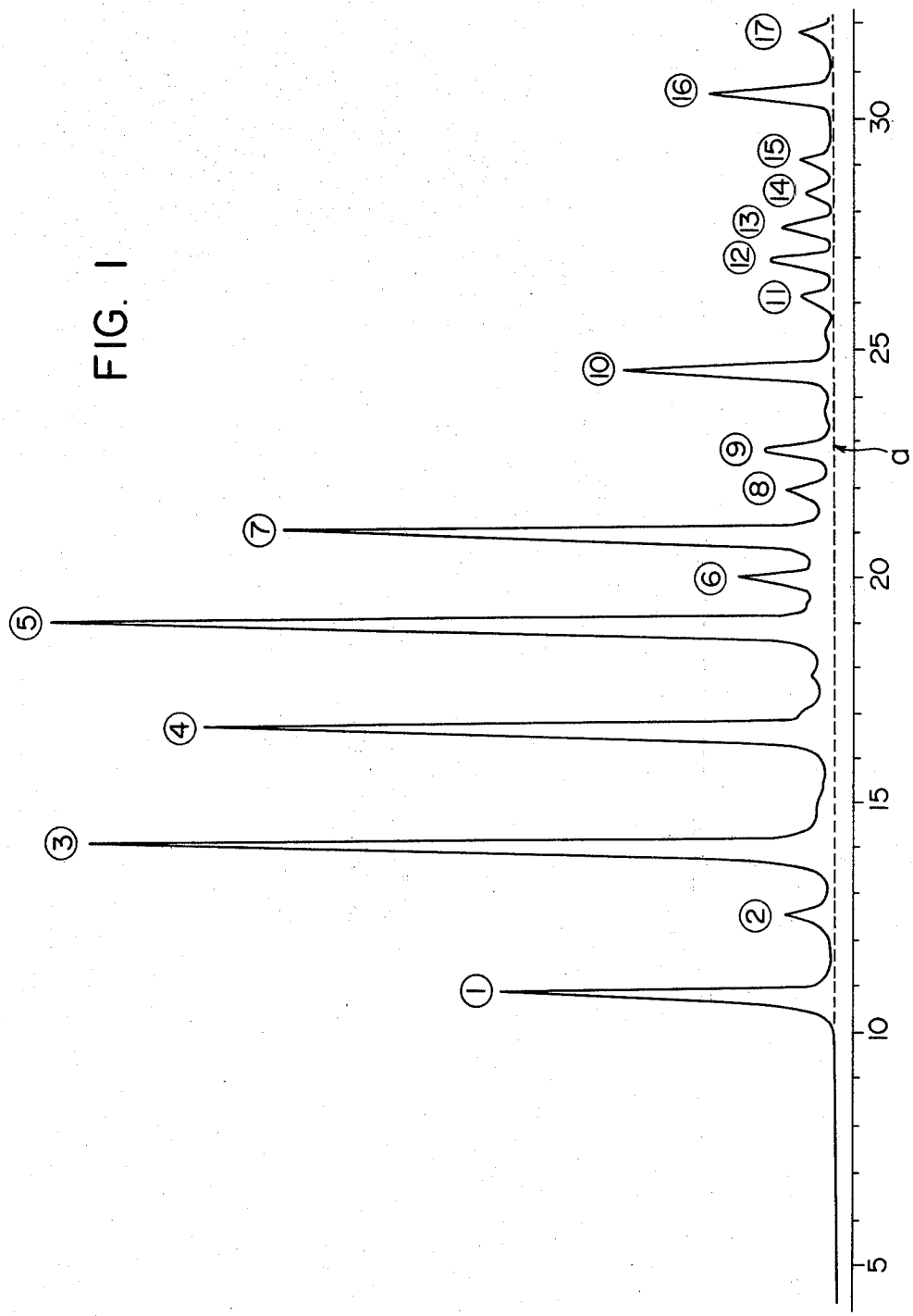

United States Patent [19]

Hasui et al.

[11] 4,405,807
[45] Sep. 20, 1983

[54] TETRAKIS[3-(3,5-DI-T-BUTYL-4-HYDROXY-PHENYL)PROPIONYLOXYMETHYL]METHANE HAVING A NOVEL CRYSTAL STRUCTURE AND PROCESS FOR PRODUCTION THEREOF

[75] Inventors: Hiroshi Hasui, Tokyo; Toshikazu Furihata, Ichihara; Kazuko Takanashi, Futtsu; Masahiko Ohmori, Ichihara, all of Japan

[73] Assignee: Mitsui Petrochemical Industries, Ltd., Japan

[21] Appl. No.: 224,831

[22] Filed: Jan. 13, 1981

[30] Foreign Application Priority Data

Jan. 14, 1980 [JP]  Japan ................................. 55-2101
Apr. 1, 1980 [JP]  Japan ................................ 55-41177

[51] Int. Cl.³ ............................................. C07C 69/76
[52] U.S. Cl. ............................... 560/75; 260/45.85 P
[58] Field of Search ................... 560/75; 260/45.85 P

[56] References Cited

FOREIGN PATENT DOCUMENTS 288839  4/1967  Australia ............................. 560/75

*Primary Examiner*—Paul J. Killos
*Attorney, Agent, or Firm*—Wenderoth, Lind & Ponack

[57] ABSTRACT

Novel tetrakis[3-(3,5-di-t-butyl-4-hydroxyphenyl)propionyloxymethyl)methane having a novel crystal structure characterized by the fact that its X-ray diffraction pattern obtained by X-ray analysis using Cu-K$_\alpha$ rays shown a sharp peak at a diffraction angle $2\theta = 10.90°$. The above compound can be prepared by (a) transesterifying methyl or ethyl 3-(3,5-di-t-butyl-4-hydroxyphenyl)propionate with pentaerythritol in the presence of a compound of the formula

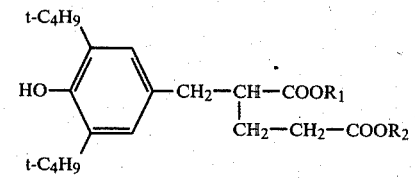

wherein R$_1$ and R$_2$ each represent an alkyl group having 1 to 6 carbon atoms, (b) treating the resulting tetrakis[3-(3,5-di-t-butyl-4-hydroxyphenyl)propionyloxymethyl)methane with a lower alkanol capable of forming a molecular adduct compound therewith to convert it into the corresponding molecular adduct compound, and (c) recrystallizing the molecular adduct compound from ethanol as a solvent.

7 Claims, 4 Drawing Figures

TETRAKIS[3-(3,5-DI-T-BUTYL-4-HYDROXY-PHENYL)PROPIONYLOXYMETHYL]METHANE HAVING A NOVEL CRYSTAL STRUCTURE AND PROCESS FOR PRODUCTION THEREOF

This invention relates to tetrakis[3-(3,5-di-t-butyl-4-hydroxyphenyl)propionyloxymethyl]methane, and a process for production thereof.

Tetrakis[3-(3,5-di-t-butyl-4-hydroxyphenyl)propionyloxymethyl]methane is a known compound of the following formula

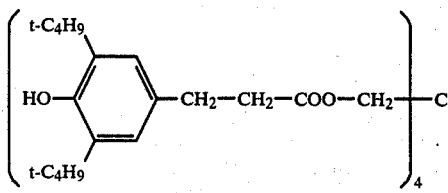

and is commercially available, for example, as an antioxidant for polyolefins.

The compound of formula (I) now commercially available is not entirely satisfactory in industrial applications in regard to transportability, handleability, meterability, etc. It is a white fine powder and has a low apparent density and poor flowability. Thus, it scatters vigorously into the air during handling, or when it is melted and mixed with a polyolefin in an extruder, its meterability is poor.

The most general method for producing the compound of formula (I) essentially involves transesterification of methyl or ethyl 3-(3,5-di-t-butyl-4-hydroxyphenyl)propionate of the following formula

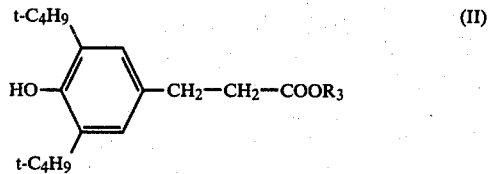

wherein $R_3$ represents a methyl or ethyl group, with pentaerythritol, and is proposed, for example, in Japanese Pat. No.18617/67, Japanese Pat. No. 19083/67 (corresponding to British Pat. No. 1,081,789), and Japanese Laid-Open Patent Publication No. 94644/74 (corresponding to British Pat. No. 1,451,118).

Investigations of the present inventors have shown that the compound of formula (I) provided by the prior art techniques disclosed in these patent documents is not free from the defects of the commercial tetrakis [3-(3,5-di-t-butyl-4-hydroxyphenyl)propionyloxymethyl]methane.

Example 2, (a) of the specification of Japanese Pat. No. 18617/67 states that the compound of formula (I) was obtained as a clear amber-colored vitreous material (having a softening point of 50° to 60° C.) by chromatographing the transesterification reaction mixture of methyl 3-(3,5-di-t-butyl-4-hydroxyphenyl)propionate (corresponding to formula (II) in which $R_3$ is a methyl group) and pentaerythritol with hexane as an eluent, and removing the hexane from the resulting eluate. A mechanical pulverizing step is required, however, in order to convert the resulting vitreous compound of formula (I) into a powdery commercial product, and therefore, the form of the product obtained by the method of this patent document is not desirable.

Example 2, (c) of this patent publication states that the compound of formula (I) having a high melting point (119° to 122° C.) was obtained from the transesterification reaction mixture by the neutralization and subsequent recrystallization from heptane. The resulting compound (I), however, is colored yellow, and cannot be supplied to the market as such.

Furthermore, Example 2, (c) of this patent publication also states that by using cyclohexane as a recrystallization solvent, the compound of formula (I) having a low melting point (80° to 90° C.) can be obtained. But the product obtained by this method is heavily colored, and can neither be supplied to the market as such.

Example II of British Pat. No. 1,081,789 states that the compound of formula (I) having a melting point of 121° to 122° C. was obtained by neutralizing the transesterification reaction mixture, adding 95% isopropanol to isolate a molecular adduct compound of the compound of formula (I) and isopropanol, and subsequently recrystallizing it from heptane. The compound of formula (I) obtained by this method is also colored yellow, and cannot be supplied to the market as such.

Example 4 British Pat. No. 1,451,118 states that the compound of formula (I) was obtained by slowly adding methyl acrylate to 2,6-di-t-butylphenol in the presence of an alkaline catalyst at a high temperature of 100° to 104° C. to synthesize methyl 3-(3,5-di-t-butyl-4-hydroxyphenyl)propionate, subsequently transesterifying the reaction mixture with pentaerythritol without isolating the methyl ester, and recrystallizing the neutralized reaction mixture from ethanol. The compound of formula (I) obtained by this method has a low purity, and is colored yellow. Thus, it can not be supplied to the market as such.

As discussed above, the compounds of formula (I) obtained by the prior art methods disclosed in these prior patent documents are vitreous, or colored yellow, or have a low purity, or have poor properties as a powder. Accordingly, they are not free from the defects of the compound of formula (I) now commercially available.

It has now been found in accordance with this invention that the compound of formula (I) can be obtained as purified colorless fine particles having good properties by performing the transesterification reaction of methyl or ethyl 3-(3,5-di-t-butyl-4-hydroxyphenyl)propionate of formula (II) with pentaerythritol in the presence of a compound of the following formula

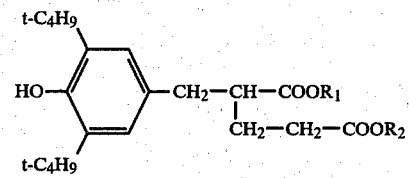

wherein $R_1$ and $R_2$ represents an alkyl group having 1 to 6 carbon atoms, treating the resulting compound of formula (I) with a lower alcohol capable of forming a molecular adduct compound with the compound of formula (I) to convert it into such a molecular adduct compound, and recrystallizing the adduct compound from ethanol as a solvent.

According to one aspect, the present invention provides a process for producing tetrakis[3-(3,5-di-t-butyl-4-hydroxyphenyl)propionyloxymethyl]methane [compound of formula (I)], which comprises (a) transesterifying methyl or ethyl 3-(3,5-di-t-butyl-4-hydroxyphenyl)propionate with pentaerythritol in the presence of a compound of the formula

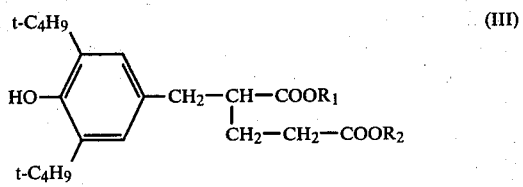

(III)

wherein $R_1$ and $R_2$ each represent an alkyl group having 1 to 6 carbon atoms, (b) treating the resulting tetrakis[3-(3,5-di-t-butyl-4-hydroxyphenyl)propionyloxymethyl]methane with a lower alkanol capable of forming a molecular adduct compound therewith to convert it into the corresponding molecular adduct compound, and (c) recrystallizing the molecular adduct compound from ethanol as a solvent.

The present invention have examined in detail the compound of formula (I) produced by the process of this invention, and found that it has a novel crystal structure which is quite different from those of the compounds of formula (I) produced by the prior methods described hereinabove.

Specifically, the tetrakis[3-(3,5-di-t-butyl-4-hydroxyphenyl)propionyloxymethyl]methane, the compound of formula (I), provided by the process of this invention gives an X-ray diffraction pattern shown in FIG. 1 of the accompanying drawings when it is subjected to X-ray analysis using Cu-$K_\alpha$ rays, and exhibits the diffraction angle ($2\theta$)-relative intensity relation shown in Table 1. Its X-ray diffraction pattern is characterized by the fact that a sharp peak exists at a diffraction angle $(2\theta)=10.90°$. This characteristic makes the compound provided by this invention clearly distinct from the same compounds produced by the conventional techniques.

TABLE 1

| Peak No. | X-ray diffraction peaks (Cu-$K_\alpha$ rays) Diffraction angle ($2\theta$) (°) | relative intensity (%) |
| --- | --- | --- |
| 1 | 10.90 | 42 |
| 2 | 12.55 | 6 |
| 3 | 14.10 | 95 |
| 4 | 16.70 | 80 |
| 5 | 18.95 | 100 |
| 6 | 20.00 | 12 |
| 7 | 21.00 | 69 |
| 8 | 21.95 | 6 |
| 9 | 22.80 | 5 |
| 10 | 24.55 | 26 |
| 11 | 26.15 | 4 |
| 12 | 26.95 | 8 |
| 13 | 27.70 | 6 |
| 14 | 28.40 | 3 |
| 15 | 29.15 | 4 |
| 16 | 30.55 | 15 |
| 17 | 31.90 | 4 |
| 18 | 32.50 | 10 |
| 19 | 33.15 | 6 |

Thus, according to another aspect, the present invention provides tetrakis[3-(3,5-di-t-butyl-4-hydroxyphenyl)propionyloxymethyl]methane having a novel crystal structure characterized by the fact that its X-ray diffraction pattern obtained by X-ray analysis using Cu-$K_\alpha$ rays shows a sharp peak at a diffraction angle $(2\theta)=10.90°$.

The diffraction pattern shown in Table 1 and FIG. 1 was determined by a powder diffraction method, and the values of diffraction angle $2\theta$ are diffraction angles which exacty meet the Bragg reflecting conditions and contain a measuring error of about ±0.05°. The intensity of diffracting X-rays is determined by a diffractometric method. The relative intensity (%) is a relative value of a given intensity when the intensity at a diffraction angle $(2\theta)=18.95°$ is taken as 100. Some errors will however arise depending upon the kind of a measuring device, the measuring operation, etc.

The X-ray diffraction chart of the compound of this invention shown in FIG. 1 is a spectrum showing the relation between the diffraction angle $2\theta$ (abscissa) and the intensity (ordinate) of the diffracting X-rays, and the numbers attached to the individual peaks in the chart correspond to the peak numbers in Table 1.

Thus, the values of the diffraction angle given in Table 1 are values corresponding to the individual peaks in FIG. 1. The relative intensity (%) is determined by connecting two points at $2\theta=10°$ and $30°$ on the spectral line by a straight line to provide a standard line a (broken line), and measuring the distance between the position of a certain peak and the standard line.

The basic operations regarding powder X-ray diffraction are described, for example, in a Japanese-language publication "X-ray Crystallography", 5th edition, edited by Isamu Nita, published jby Maruzen Co., Ltd.

Investigations of the present inventors have shown that the compound of formula (I) has a property termed polymorphism in crystallography, and various kinds of stable or metastable crystal are formed. The crystal forms of the compounds of formula (I) disclosed in the above-cited prior art documents, and these compounds provided by the prior art techniques are clearly distinguished from the compound of formula (I) provided by the present invention in regard to X-ray diffraction pattern, melting point, etc.

Tetrakis[3-(3,5-di-t-butyl-4-hydroxyphenyl)propionyloxymethyl]methane having the novel crystal structure which is provided by the present invention has the following physicochemical properties.

(1) Melting point

About 111° to about 118° C. although varying depending upon the method of measurement.

(2) Proton nuclear magnetic resonance spectrum

Figure 2:
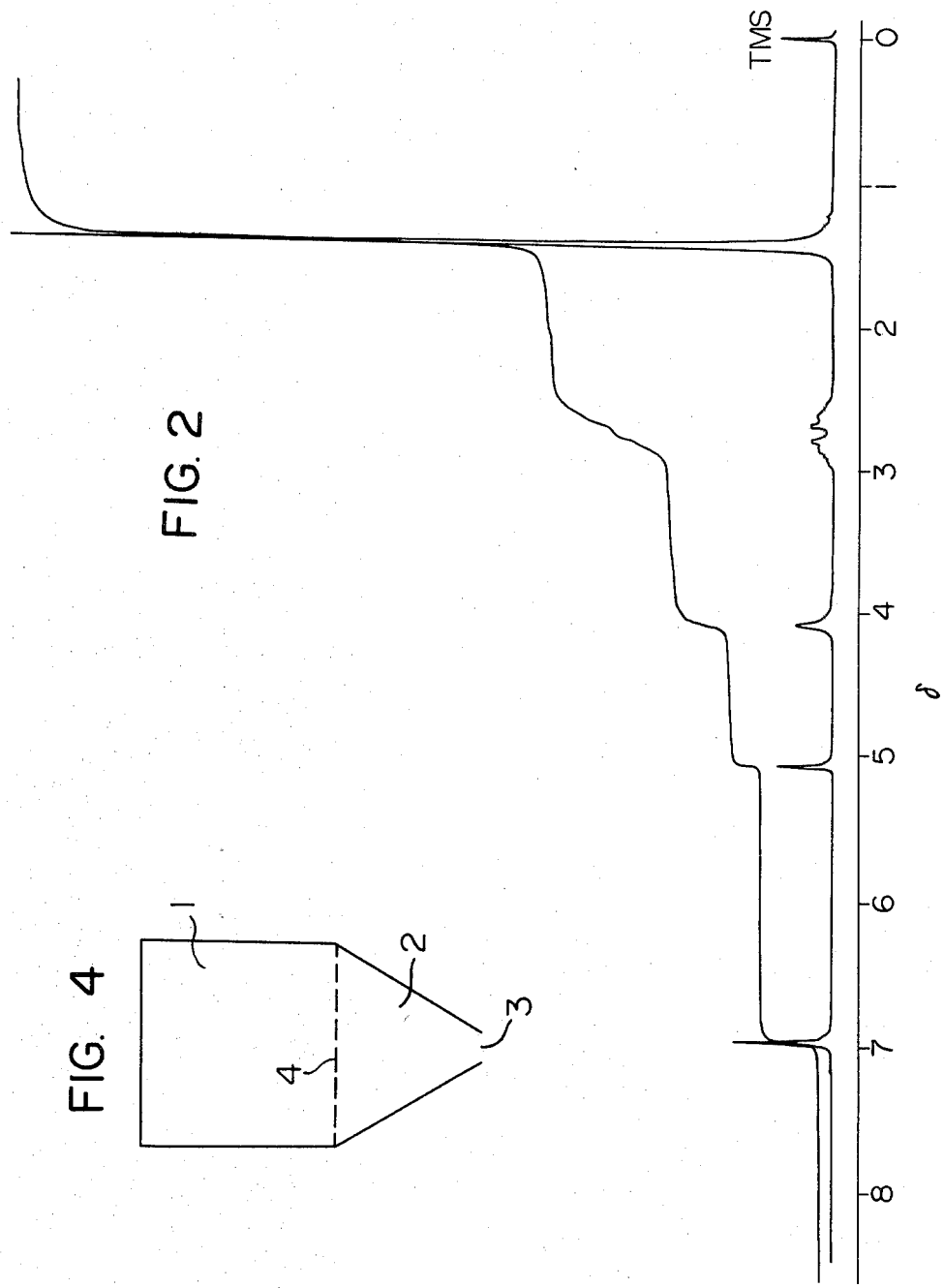

The proton nuclear magnetic resonance spectrum measured in CDCl$_3$ at 100 MHz is shown in FIG. 2.

(3) Infrared absorption spectrum

Figure 3:
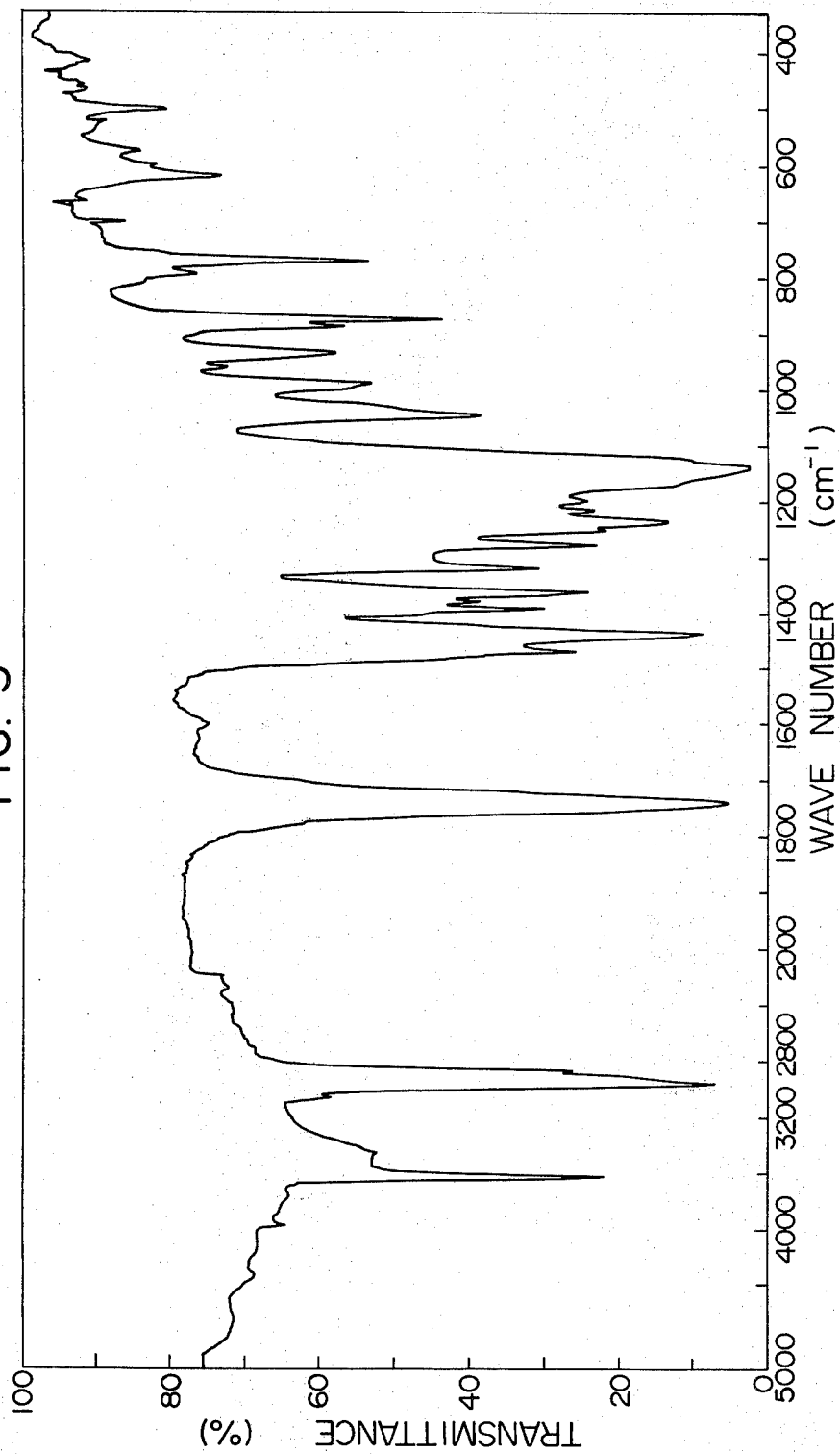

The infrared absorption spectrum measured by a KBr tablet method is shown in FIG. 3.

(4) Appearance

The compound of formula (I) provided by the present invention is in the form of fine particles which are colorless and have excellent flowability. It has an apparent density of generally 0.5 to 0.6 when measured in accordance with ASTM D1895 Method A (1977).

Accordingly, the compound of formula (I) of this invention has excellent transportability, handleability and meterability, and is satisfactory for industrial applications.

The compound of formula (I) having novel properties, particularly a novel crystal structure, is produced by the process described below in detail.

In the first step, methyl or ethyl 3-(3,5-di-t-butyl-4-hydroxyphenyl)propionate of formula (II) is transesterified with pentaerythritol in the presence of a compound of the formula

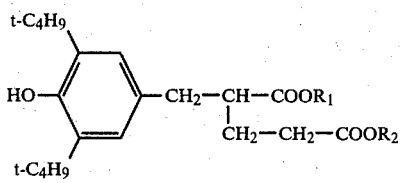

(III)

wherein $R_1$ and $R_2$ each represent an alkyl group having 1 to 6 carbon atoms. The performance of the transesterification step in the presence of the compound of formula (III), when coupled with a specific method employed in the purifying step to be described, is of utmost importance in obtaining the compound of formula (I) having the novel crystal structure.

In formula (III), the alkyl group for $R_1$ and $R_2$ may be a linear or branched alkyl group, and includes, for example, methyl, ethyl, n- or iso-propyl, n-, sec-, iso- or tert-butyl, n-pentyl, isoamyl, and n-hexyl. Methyl and ethyl are preferred.

The two alkyl groups $R_1$ and $R_2$ in formula (III) may be identical or different.

Typical examples of preferred compounds of formula (III) used in this step are given below.

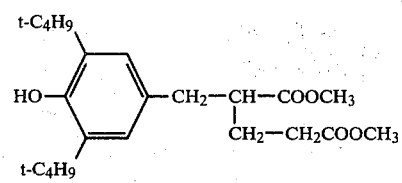

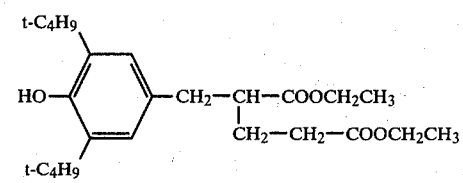

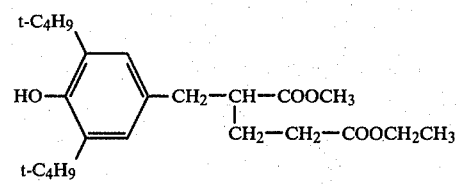

The compound of formula (III) may be used in an amount of generally about 0.03 to about 2.0 parts by weight, preferably about 0.3 to about 1.0 part by weight, per 100 parts by weight of the ester of formula (II).

Desirably, the compound of formula (III) is incorporated in the reaction system prior to the transesterification reaction. It may, if required, be incorporated into the reaction system at any stage during the transesterification reaction.

The ester used as a starting material is methyl or ethyl 3-(3,5-di-t-butyl-4-hydroxyphenyl)propionate or a mixture of these two esters.

The ester of formula (II) may be used in an amount slightly in excess of the stoichiometrical amount based on pentaerythritol, for example usually about 4 to about 5 moles, preferably about 4.2 moles to about 4.4 moles, per mole of pentaerythritol.

Generally, the transesterification reaction is carried out in an inert organic solvent. Examples of useful solvents include dimethyl sulfoxide, dimethyl formamide, tetrahydrofuran, dioxane, diglyme, dimethyl acetamide, hexamethyl phosphoramide, 1,2-dimethoxyethane, acetonitrile, propionitrile, and t-butyl alcohol. Of these, dimethyl formamide and dimethyl sulfoxide are preferred. The amount of the solvent used is not critical, but generally it is used in an amount of up to 5 parts by weight, preferably 0.1 to 1 part by weight, per part by weight of the ester.

It is desirable that the transesterification reaction be carried out in the presence of a catalyst. The catalyst may be any of those catalysts which have hitherto been used in the transesterification reaction. Specific examples of the catalyst include alkali metal or alkaline earth metal hydrides such as sodium hydride, calcium hydride and lithium hydride; lower alkoxides of alkali metals such as lithium methoxide, sodium methoxide, potassium methoxide, lithium ethoxide, sodium t-butoxide and potassium t-butoxide; and metallic sodium and metallic potassium. The lower alkoxides of alkali metals are preferred.

The catalyst may be used in amounts usually employed. For example, the amount of the catalyst may be 0.4 to 8 parts by weight, preferably 0.8 to 5 parts by weight, per 100 parts by weight of the starting ester of formula (II).

The transesterification reaction is carried out at a temperature of generally about 80° to about 160° C., preferably 100° to 150° C., for a period of usually 5 to 10 hours until the formation of by-product alcohols (methanol, ethanol, $R_1OH$, $R_2OH$, etc.) by the reaction of the starting ester, the compound of formula (III) and pentaerythritol substantially ceases.

The by-product alcohols may be removed from the reaction system continuously during the transesterification reaction. For example, they can be distilled off from the reaction system by performing the above reaction at a reduced pressure of about 5 to about 200 mmHg. An apparatus which can be used in the transesterification reaction needs not to be particularly special, and may be any reaction vessel equipped with a stirrer, a heater and a distillation device for the by-product alcohols.

Preferably, the remaining alkaline catalyst is neutralized after the transesterification reaction. Suitable acids that can be used for the neutralization are organic acids, for example carboxylic acids such as formic acid, propionic acid and butyric acid, and sulfonic acids such as benzenesulfonic acid and p-toluenesulfonic acid. The amount of the acid may be approximately the equivalent to the alkaline catalyst added to the reaction system.

The product obtained in the transesterification reaction described in detail above is subsequently subjected to the following purification step.

Specifically, a certain kind of alcohol capable of reacting with the compound of formula (I) to form the corresponding molecular adduct compound is added to tetrakis[3-(3,5-di-t-butyl-4-hydroxyphenyl)propionyloxymethyl]methane formed by the transesterification reaction to form a molecular adduct compound consisting of the compound of formula (I) and the alcohol, and subsequently, the molecular adduct compound is recrystallized from ethanol.

A series of operations in this purification step is essential in the production of the compound of formula (I) having the novel crystal structure. When the recrystallization from ethanol is carried out without performing the operation of forming the molecular adduct compound, the compound of formula (I) cannot be obtained as fine particles having the aforesaid crystal structure and good properties. When a hydrocarbon such as hexane, cyclohexane or heptane is used as the recrystallization solvent, the resulting compound is colored yellow or a fine powder having poor properties.

Examples of preferred alcohols for forming the molecular adduct compound are lower alkanols having 3 or 4 carbon atoms such as n-propanol, isopropanol, n-butanol, sec-butanol and isobutanol. Isopropanol and isobutanol are especially preferred.

In forming the molecular adduct compound, the lower alkanol is advantageously added in an amount of about 100 to about 1000 ml, preferably 300 to 600 ml, per 100 g of the compound of formula (I) formed by the transesterification reaction.

The molecular adduct compound is formed by contacting the lower alkanol with the transesterification reaction mixtured. Generally, when the reaction mixture and the lower alkanol are stirred at a temperature of usually at least about 70° C. to form a homogeneous solution and subsequently the solution is cooled, the molecular adduct compound begins to precipitate as crystals at about 55° to about 80° C., although this depends upon the kind of the alkanol used. The solution is further cooled to complete precipitation, and the crystals are separated by such a procedure as filtration or decantation. As required, the solution may be aged at 55° to 80° C. for about 1.5 to about 2 hours.

The molecular adduct compound separated is recrystallized from ethanol as a recrystallization solvent in a customary manner using ethanol as in arbitrary ratios. As a result, the alcohol which is one component of the molecular adduct compound is liberated and the compound of formula (I) can be obtained as purified white fine particles.

Prior to the recrystallization operation, the molecular adduct compound may be heated under reduced pressure to liberate the alcohol. It should be understood therefore that the term "molecular adduct compound" to be subjected to the recrystallization step also includes such a compound from which the alcohol has been liberated in this manner.

Ethanol needs not to be of completely purified grade. There can even be used ethanol which contains such a solvent as hexane, heptane, cyclohexane, toluene water or methanol in such a small amount which does not reduce the effect of the present invention. For example, commercially available ethanol containing about 4% by weight of water may be used as such as the recrystallization solvent.

The amount of ethanol as the recrystallization solvent is not particularly critical. Advantageously, it is used in an amount of generally about 100 to about 1000 ml, preferably about 200 to about 400 ml, per 100 g of the molecular adduct compound.

The recrystallization operation may be carried out by a method known per se. The molecular adduct compound is added to the recrystallization solvent, and the mixture is heated to form a complete uniform solution. The solution is then cooled to room temperature or below to precipitate the compound of formula (I) completely. The precipitated crystals are separated by such means as filtration to obtain the compound of formula (I).

The compound of formula (I) obtained by the above purification step is in the form of fine particles having good properties, and it can be very easily separated from the mother liquor. After separation from the mother liquor, the compound is dried to form a final product of formula (I).

The compound of formula (I) so obtained is in the form of white fine particles having properties characterized by the aforesaid X-ray diffraction pattern, melting point, NMR spectrum, infrared absorption spectrum, etc., and further having such excellent properties as a high apparent density and high flowability. It has much better quality than the compounds of formula (I) produced by the aforesaid conventional techniques.

Since the compound of formula (I) provided by the present invention has such excellent properties, it can be used with industrial advantage as an antioxidant for polyolefins, particularly polyethylene and polypropylene, and its antioxidant effect is higher.

The following examples illustrate the present invention further.

EXAMPLE 1

A 500 ml four-necked flask equipped with a stirrer, a reflux condenser, a thermometer and a nitrogen introducing tube was charged with 50 ml of dimethyl formamide, 2.83 g of potassium t-butoxide, 124.0 g of methyl 3-(3,5-di-t-butyl-4-hydroxyphenyl)propionate, 13.12 g of pentaerythritol and 0.62 g (0.5% by weight based on the above methyl ester) of a compound of formula (III) in which $R_1$ and $R_2$ are both methyl groups, and they were stirred at 87° C. for 10 minutes. The mixture was then heated at 90° C. and 30 mmHg for 1 hour, and the resulting methanol was distilled off. The reaction mixture was maintained at 100° to 140° C. and 20 mmHg for 6 hours to distill off small amounts of methanol formed and dimethyl formamide and complete the transesterification reaction.

The reaction mixture was cooled to 120° C., and nitrogen gas was introduced to return the pressure to atmospheric pressure. Glacial acetic acid (1.7 ml) was added to neutralize the transesterification reaction mixture. The neutralized reaction mixture was dissolved in 350 ml of benzene and washed with warm water to remove the salt. The benzene was then distilled off. To the resulting yellow vitreous substance was added 500 ml of isopropanol, and the mixture was heated at 75° C. to form a solution. The solution was cooled to room temperature to precipitate the molecular adduct compound. The precipitate was filtered and washed with 200 ml of isopropanol. The resulting molecular adduct compound was dried in a vacuum oven at 45° C. to remove the isopropanol adhering to the molecular adduct compound. Then, 350 ml of ethanol (containing about 4% of water) was added, and the mixture was heated to 70° C. to form a homogeneous solution. The solution was cooled to room temperature, and the resulting crystals were separated by filtration and dried to afford 100 g (yield 88%) of tetrakis[3-(3,5-di-t-butyl-4-hydroxyphenyl)propionyloxymethyl]methane [compound of formula (I)] as white fine particles. The ratio of recovery of this product was 95% based on the compound contained in the transesterification reaction mixture.

The elemental analysis of the product showed the following results.

|  | C | H |
|---|---|---|
| Calculated: | 74.5% | 9.2% |
| Found: | 74.3% | 9.3% |

The X-ray diffraction pattern (Cu-K$_\alpha$ rays), proton nuclear magnetic resonance spectrum (in CDCl$_3$, 100 MHz) and infrared absorption spectrum (KBr tablet method) of the resulting product were as shown in FIGS. 1, 2 and 3.

The resulting product had a melting point of about 112° to 114° C. when it was measured by a melting point measuring device equipped with a microscope. It was found to have a purity of about 99% when it was analyzed by liquid chromatography.

Ten grams of the resulting product was dissolved in toluene to prepare 100 ml (accurately measured) of a solution. The transmittance of the solution was measured by using a 1 cm wide cell by visible light at 425 nm, and was found to be 98%.

The apparent density and the falling speed of the resulting powdery product were measured by the following methods.

Figure 4:
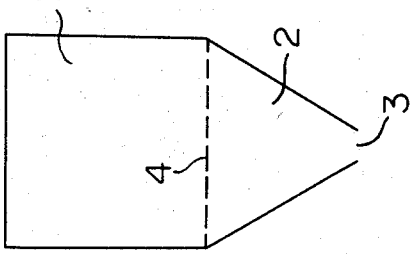

200 ml of the sample was charged into a hopper consisting of a hollow cylindrical portion 1 and a fructoconical portion 2 with a joint 4 there-between in FIG. 4 of the attached drawings, and the time in seconds which elapsed until all of the sample flowed out of the hopper through an outlet opening 3 was measured, and defined as the falling speed. The longer the time, the worse its flowability. The diameter of the outlet opening 3 for the sample was 8 mm; the diameter of the cylindrical portion 1 was 83 mm; and the distance between the joint 4 and the sample outlet 3 was 65 mm.

The results are shown in Table 2.

EXAMPLES 2 AND 3

Example 1 was repeated except that the conditions shown in Table 2 were used. The results are also shown in Table 2.

COMPARATIVE EXAMPLE 1

Example 1 was repeated except that the compound of formula (III) was not added.

COMPARATIVE EXAMPLE 2

Example 1 was repeated except that hexane was used as the recrystallization solvent. A compound of formula (I) which was colored yellow was obtained. The results are shown in Table 2.

COMPARATIVE EXAMPLE 3

Comparative Example 1 was repeated except that heptane was used as the recrystallization solvent. A yellow colored compound of formula (I) was obtained. The results are shown in Table 2.

COMPARATIVE EXAMPLE 4

In the procedure of Comparative Example 1, the step of precipitating the molecular adduct compound by adding isopropanol was omitted, and the yellow vitreous substance obtained after distillation of benzene was recrystallized from ethanol. Even when the ethanol solution was cooled to room temperature, the compound of formula (I) precipitated only in a small amount. Thus, the solution was allowed to stand for 12 hours in an atmosphere kept at 5° C., and the precipitated compound was separated by filtration. The yield and the properties of the compound of formula (I) are shown in Table 2.

COMPARATIVE EXAMPLE 5

Comparative Example 4 was repeated except that the transesterification reaction was performed in the absence of the compound of formula (III). The results are shown in Table 2.

COMPARATIVE EXAMPLE 6

In the procedure of Comparative Example 5, cyclohexane was used instead of the ethanol as the recrystallization solvent. Even when the cyclohexane solution was left to stand for 12 hours in an atmosphere kept at 5° C., only a small amount of the compound of formula (I) precipitated. Thus, it was further left to stand in an atmosphere at 5° C. for 1 week. Otherwise, the same procedure as in Comparative Example 5 was performed. The results are shown in Table 2.

For information, the properties of the commercially available compound of formula (I) [Irganox 1010, a trademark for a product of Ciba-Geigy] are also shown in Table 2 (Comparative Example 7).

TABLE 2

|  | Example | | | Comparative Example | | | | | | |
|---|---|---|---|---|---|---|---|---|---|---|
|  | 1 | 2 | 3 | 1 | 2 | 3 | 4 | 5 | 6 | 7 (*1) |
| Amount of compound (III) present (wt. %) | 0.5 | 0.8 | 0.5 | 0 | 0.5 | 0 | 0.5 | 0 | 0 | — |
| Lower alkanol added | isopropanol | isopropanol | isobutanol | isopropanol | isopropanol | isopropanol | none | none | none | — |
| Recrystallization solvent | ethanol | ethanol | ethanol | ethanol | hexane | heptane | ethanol | ethanol | cyclohexane | — |
| Ratio of recovery (%) (*2) | 95 | 95 | 96 | 95 | 95 | 95 | 88 | 93 | 50 | — |
| Properties of Compound (I) | | | | | | | | | | |
| Melting point (%) | 112–114 | 112–114 | 113–116 | 123–125 | 120–123 | 122–125 | 109–113 | 109–113 | 70–80 | 110–124 |
| Purity (%) | 99 | 99 | 99 | 99 | 98 | 99 | 93 | 93 | — | 99 |
| Appearance | white | white | white | white | yellow | yellow | yellow below | yellow below | yellow below | white |
| Transmittance (%) | 98 | 98 | 98 | 98 | 90 | 85 | 80 | 80 | 80 | 98 |

TABLE 2-continued

|  | Example | | | Comparative Example | | | | | | |
|---|---|---|---|---|---|---|---|---|---|---|
|  | 1 | 2 | 3 | 1 | 2 | 3 | 4 | 5 | 6 | 7 (*1) |
| Powder test | | | | | | | | | | |
| Bulk density | 0.57 | 0.51 | 0.50 | 0.39 | 0.34 | 0.51 | 0.30 | — | — | 0.04–0.39 (*3) |
| Falling speed (sec/200 ml) | 29 | 35 | 40 | 150 | 60 | 28 | 42 | — | — | 455 |

(*1) Irganox 1010;
(*2) Percentage of the recovered product based on the compound (I) contained in the transesterification mixture;
(*3) The reproducibility was poor, and the bulk density fluctuated between 0.04 and 0.39.

What we claim is:

1. Tetrakis[3-(3,5-di-t-butyl-4-hydroxyphenyl)propionyloxymethyl]-methane having a novel crystal structure characterized by the fact that its X-ray diffraction pattern obtained by X-ray analysis using Cu-K$_{60}$ rays shown a sharp peak at a diffraction angle $2\theta = 10.90°$.

2. The compound of claim 1 which gives the X-ray pattern shown in FIG. 1 when it was subjected to X-ray analysis using Cu-K$_\alpha$ rays.

3. The compound of claim 1 which has a melting point in the range of about 111° C. to about 118° C.

4. A process for producing tetrakis[3-(3,5-di-t-butyl-4-hydroxyphenyl)propionyloxymethyl]methane having a novel crystal structure characterized by the fact that its X-ray diffraction pattern obtained by X-ray analysis using Cu-K$_{60}$ rays shows a sharp peak at a diffraction angle $2\theta = 10.90°$, said process comprising (a) transesterifying methyl or ethyl 3-(3,5-di-t-butyl-4-hydroxyphenyl)propionate with pentaerythritol in the presence of a compound of the formula

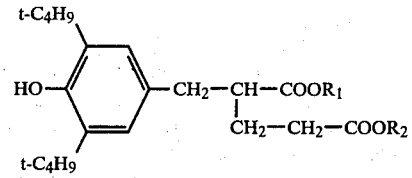

wherein R$_1$ and R$_2$ each represent an alkyl group having 1 to 6 carbon atoms, (b) treating the resulting tetrakis[3-(3,5-di-t-butyl-4-hydroxyphenyl)propionyloxymethyl]methane with a lower alkanol capable of forming a molecular adduct compound therewith to convert it into the corresponding molecular adduct compound, and (c) recrystallizing the molecular adduct compound from ethanol as a solvent.

5. The process of claim 4 wherein the amount of the compound of formula (III) is 0.3 to 2 parts by weight per 100 parts by weight of the methyl or ethyl 3-(3,5-di-t-butyl-4-hydroxyphenyl)propionate.

6. The process of claim 5 wherein the lower alkanol is an alkanol having 3 or 4 carbon atoms.

7. Use of the compound of claim 1 as an antioxidant for polyolefins.

* * * * *